(12) United States Patent
Liu et al.

(10) Patent No.: US 10,116,489 B2
(45) Date of Patent: Oct. 30, 2018

(54) APPARATUS AND METHOD FOR MANAGING NETWORK ACCESS DEVICE

(71) Applicants: Beijing Qihoo Technology Company Limited, Beijing (CN); Qizhi Software (Beijing) Company Limited, Beijing (CN)

(72) Inventors: Zhi Liu, Beijing (CN); Hongyi Zhou, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 190 days.

(21) Appl. No.: 15/028,258

(22) PCT Filed: Aug. 26, 2014

(86) PCT No.: PCT/CN2014/085182
§ 371 (c)(1),
(2) Date: Apr. 8, 2016

(87) PCT Pub. No.: WO2015/051675
PCT Pub. Date: Apr. 16, 2015

(65) Prior Publication Data
US 2016/0254941 A1 Sep. 1, 2016

(30) Foreign Application Priority Data

Oct. 9, 2013 (CN) .......................... 2013 1 0468093

(51) Int. Cl.
*G06F 15/173* (2006.01)
*H04L 12/24* (2006.01)
(Continued)

(52) U.S. Cl.
CPC ...... *H04L 41/0226* (2013.01); *H04L 41/0806* (2013.01); *H04W 4/50* (2018.02); *H04L 41/0213* (2013.01); *H04L 61/2015* (2013.01)

(58) Field of Classification Search
CPC .............................. H04L 41/02; H04L 41/08
(Continued)

(56) References Cited

FOREIGN PATENT DOCUMENTS

CN 102572389 A * 7/2012
CN 102752389 10/2012
(Continued)

*Primary Examiner* — Glenford Madamba
(74) *Attorney, Agent, or Firm* — Harness, Dickey & Pierce, P.L.C.

(57) ABSTRACT

Disclosed are an apparatus and method for managing a network access device, the apparatus comprising: one or more non-transitory computer readable medium configured to store computer-executable instructions; and at least one processor to execute the computer-executable instructions to cause: setting up a connection between a terminal device and the network access device; sending, by the terminal device, a brand/model request message to the network access device, and obtaining information characterizing the brand/model of the network access device from a brand/model response message returned by the network access device; initiating, by the terminal device, a query request according to the information characterizing the brand/model of the network access device to obtain a management adaptation scheme of the network access device corresponding to the information characterizing the brand/model of the network access device from pre-stored management adaptation schemes of network access devices with respective brands/models; and executing, at the terminal device, the corresponding management adaptation scheme of the network access device.

9 Claims, 4 Drawing Sheets

(51) Int. Cl.
*H04W 4/50* (2018.01)
*H04L 29/12* (2006.01)

(58) Field of Classification Search
USPC .......................................................... 709/223
See application file for complete search history.

(56) References Cited

FOREIGN PATENT DOCUMENTS

| | | | |
|---|---|---|---|
| CN | 102833642 | | 12/2012 |
| CN | 102833642 A | * | 12/2012 |
| CN | 103260178 | | 8/2013 |
| CN | 103532751 | | 1/2014 |

* cited by examiner

APPARATUS AND METHOD FOR MANAGING NETWORK ACCESS DEVICE

TECHNICAL FIELD

The present invention relates to the field of device management and particularly to an apparatus and method for managing a network access device.

DESCRIPTION OF RELATED ART

Existing management on a network access device (e.g., a wireless router, etc.) is typically performed by accessing a corresponding address.

Particularly the access address of the network access device is input into an address bar of a browser, and the browser jumps to a webpage corresponding to the access address, where the webpage is an access management interface of the network access device, and a user can manage the network access device, for example, modify a password, request for modifying a bandwidth, restoring factory settings, disabling the network access device, via the access management interface.

The inventors have identified during making the invention that the existing mode of management on the network access device requires the user to possess some professional knowledge and also requires the user to memorize the access address of the network access device, so the existing mode of management on the network access device may not be easy to use, and the user experience may still remain to be further improved.

BRIEF SUMMARY OF THE INVENTION

In view of the problems above, the invention has been made to provide a method for managing a network access device, and a corresponding apparatus for managing a network access device, so as to overcome or at least partially solve the problems.

According to an aspect of the invention, there is provided a method for managing a network access device, the method including: setting up, by a terminal device, a connection with the network access device; sending, by the terminal device, a brand/model request message to the network access device, and obtaining information characterizing the brand/model of the network access device from a brand/model response message returned by the network access device; initiating, by the terminal device, a query request according to the information characterizing the brand/model of the network access device to obtain a management adaptation scheme of the network access device corresponding to the information characterizing the brand/model of the network access device from pre-stored management adaptation schemes of network access devices with respective brands/models; and executing, by the terminal device, the corresponding management adaptation scheme of the network access device; wherein the executing, by the terminal device, the corresponding management adaptation scheme of the network access device comprises: carrying, by the management adaptation scheme of the network access device in the terminal device, a network access device management command input by a user in a URL-based message, and sending the URL-based message to the network access device so that the network access device performs the corresponding operation according to the network access device management command.

According to another aspect of the invention, there is provided an apparatus for managing a network access device, the apparatus including: a connecting module configured to set up a connection between a terminal device and the network access device; a brand/model requesting module configured for the terminal device to send a brand/model request message to the network access device, and to obtain information characterizing the brand/model of the network access device from a brand/model response message returned by the network access device; an obtaining module configured for the terminal device to initiate a query request according to the information characterizing the brand/model of the network access device to obtain a management adaptation scheme of the network access device corresponding to the information characterizing the brand/model of the network access device from pre-stored management adaptation schemes of network access devices with respective brands/models; and an executing module configured for the terminal device to execute the corresponding management adaptation scheme of the network access device; wherein the executing module is configured to convert a network access device management command input by the user into a URL-based message, and to send the URL-based message to the network access device so that the network access device performs the corresponding operation according to the network access device management command.

According to the technical solutions of the invention, in the embodiments of the invention, the information characterizing the brand/model of the network access device is obtained from the network access device so that the terminal device can obtain the management adaptation scheme for the network access device using the information, and the adaptation scheme can convert automatically a management command input by a user into a URL request, so the user can manage the network access device conveniently using the management adaptation scheme, thus avoiding such a phenomenon that the user has to possess some professional skill for managing the network access device, and that the user also has to memorize an access address of the network access device, so that the solution to management on the network access device according to the embodiments of the invention will be easy to use and can improve the user experience.

The foregoing description is merely a summary of the technical solutions of the invention, and in order to make the technical means of the invention more apparent and enable them to be practiced according to this disclosure of the description, and in order to make the foregoing and other objects, features, and advantages of the invention more apparent and readily understood, particular embodiments of the invention will be described below.

BRIEF DESCRIPTION OF THE DRAWINGS

Various other advantages and benefits will become apparent to those ordinarily skilled in the art upon review of the following detailed description of preferred embodiments. The drawings of the invention are merely intended to illustrate the preferred embodiments but not to limit the invention. Alike reference numerals will denote alike components through the drawings in which.

DETAILED DESCRIPTION OF THE INVENTION

Figure 1:
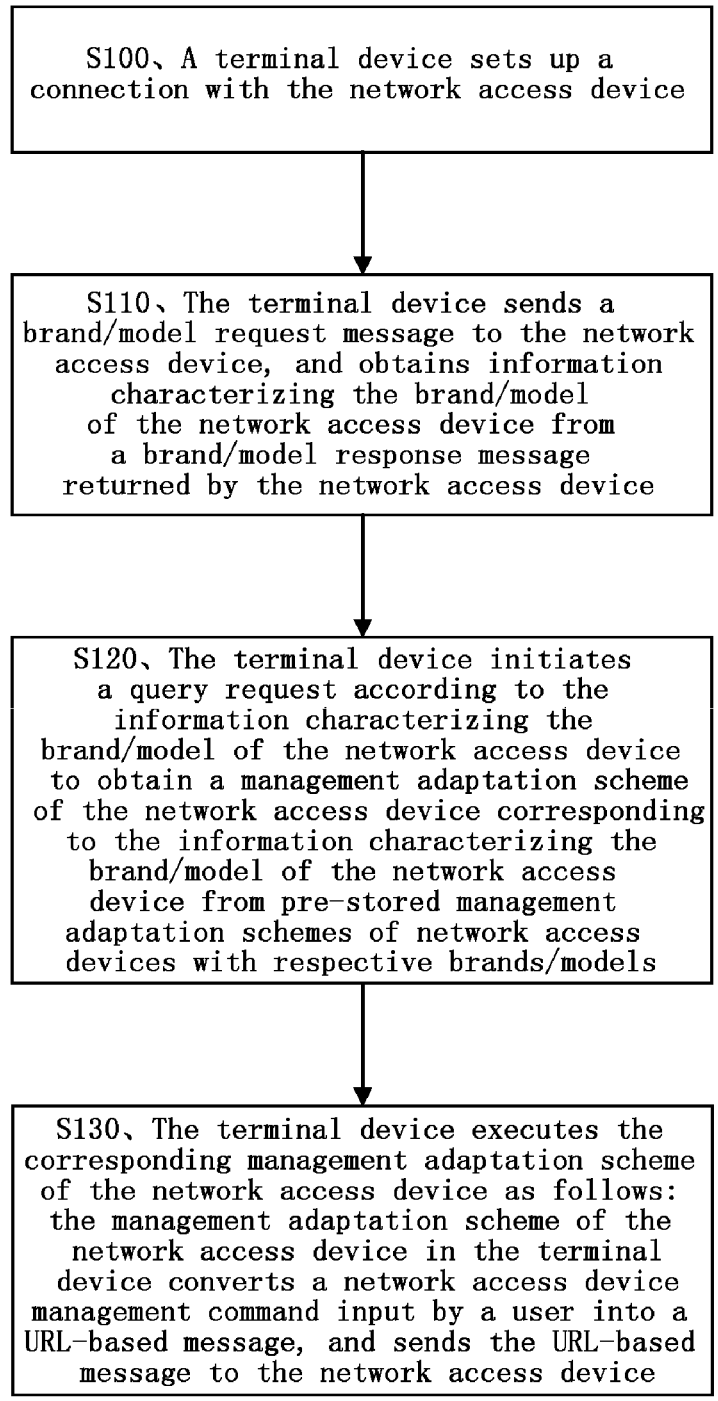
FIG. 1 illustrates a flow chart of a method for managing a network access device according to an embodiment of the invention.

Exemplary embodiments of this disclosure will be described below in further details with reference to the drawings. Although the exemplary embodiments of this disclosure are illustrated in the drawings, it shall be appreciated that this disclosure can be embodied in various forms but will not be limited to the embodiments described here. On the contrary these embodiments are provided so that this disclosure can become more apparent and the scope of this disclosure can be conveyed fully to those skilled in the art.

A first embodiment relates to a method for managing a network access device, and a flow of this method is as illustrated in FIG. 1.

At S100 in FIG. 1, a terminal device sets up a connection with the network access device.

Particularly the terminal device can be an intelligent mobile phone (e.g., an intelligent mobile phone based upon the Android operating system, an intelligent mobile phone based upon the iOS operating system, etc.), a tablet computer (e.g., a notebook computer, a desktop computer, etc.), etc.; and the network access device can be a routing device, and particularly a wireless routing device (e.g., a home wireless routing device, an enterprise wireless routing device, etc.).

When the network access device is a wireless routing device, the terminal device will send a connection setup request message to the network access device corresponding to one of wireless access hotspots selected by a user after locating the wireless access hotspots, so that the terminal device sets up the wireless connection with the network access device.

At S110, the terminal device sends a brand/model request message to the network access device, and obtains information characterizing the brand/model of the network access device from a brand/model response message returned by the network access device.

Particularly the brand/model request message is mainly configured to obtain the brand/model information of the network access device from the network access device. The brand/model request message can be a message based upon the Hypertext Transfer Protocol (HTTP).

The information characterizing the brand/model of the network access device can be the brand/model information of the network access device, or can be an index, a serial number or another identifier corresponding to the brand/model information of the network access device; that is, after receiving the brand/model request message, the network access device can obtain its brand/model information directly from its corresponding memory space, and return the brand/model response message carrying the brand/model information directly to the terminal device. Of course the network access device can alternatively return the brand/model response message carrying the index, the serial number or the other identifier corresponding to the brand/model information to the terminal device, where the brand/model response message can also be a message based upon the HTTP.

Figure 2A:
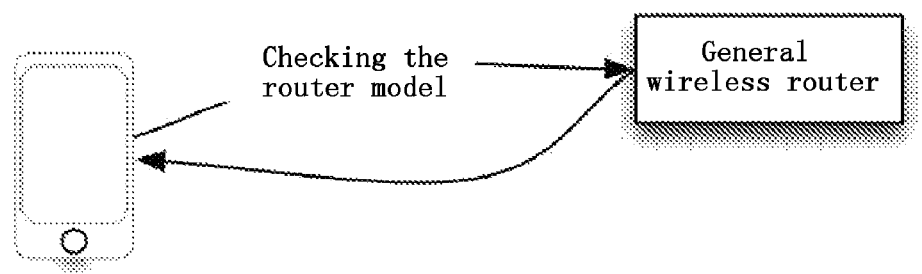
FIG. 2A to FIG. 2C illustrate schematic diagrams of a method for managing a network access device according to an embodiment of the invention.

When the network access device is a wireless router and the terminal device is an intelligent mobile phone in the embodiment of the invention, the intelligent mobile phone will obtain the information characterizing the brand/model of the wireless router from the wireless router in a process as illustrated in FIG. 2A.

At S120, the terminal device initiates a query request according to the information characterizing the brand/model of the network access device obtained by the terminal device, to obtain a management adaptation scheme of the network access device corresponding to the information characterizing the brand/model of the network access device from pre-stored management adaptation schemes of network access devices with respective brands/models.

Figure 2B:
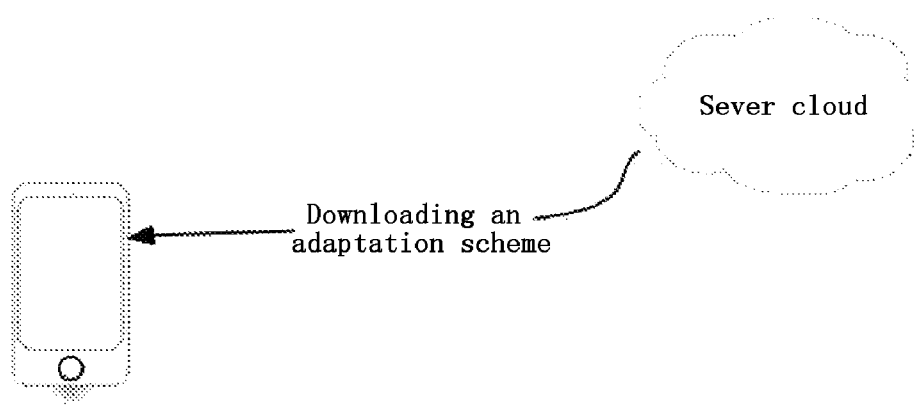
Figure 2C:
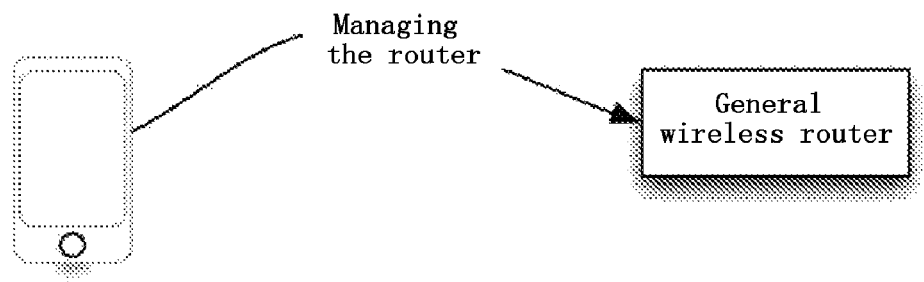

Particularly the terminal device can obtain the management adaptation scheme of the network access device corresponding to the information characterizing the brand/model of the network access device from a server (e.g., a cloud server, etc.), and in a particular example, the terminal device carries the information characterizing the brand/model of the network access device obtained by the terminal device in an adaptation scheme request message, sends the adaptation scheme request message to the server according to the address of the server pre-stored by the terminal device as a destination address of the adaptation scheme request message and; the management adaptation schemes of the network access devices with the respective brands/models are pre-stored in the server, and these management adaptation schemes of the network access devices with the respective brands/models can be obtained by collecting management adaptation schemes of existing network access devices with respective brands/models in the existing market; and after receiving the adaptation scheme request message sent by the terminal device, the server (e.g., the cloud server) obtains the information characterizing the brand/model of the network access device from the adaptation scheme request message, selects, by using the information, the management adaptation scheme of the network access device corresponding to the information characterizing the brand/model of the network access device from the management adaptation schemes of the network access devices with the respective brands/models pre-stored by the server, that is, selects the adaptation scheme of the network access device, and returns the selected adaptation scheme to the terminal device which sends the request message, for example, sends an adaptation scheme response message carrying the selected adaptation scheme to the terminal device (as illustrated in FIG. 2B).

Moreover the terminal device in the embodiment of the invention can alternatively obtain the management adaptation scheme of the network access device corresponding to the information characterizing the brand/model of the network access device from the information stored in the terminal device. In a particular example, the management adaptation schemes of the network access devices with the respective brands/models are pre-stored in the terminal device, where these management adaptation schemes of the network access devices with the respective brands/models can be obtained by collecting the management adaptation schemes of the existing network access devices with the respective brands/models in the existing market, and the collected management adaptation schemes of the network access devices with the respective brands/models can be synchronized into the terminal device through the server;

and after receiving the information characterizing the brand/model of the network access device returned by the network access device, the terminal device selects, by using the information, the management adaptation scheme of the network access device corresponding to the information characterizing the brand/model of the network access device from the management adaptation schemes of the network access devices with the respective brands/models pre-stored in the terminal device, that is, selects the adaptation scheme of the network access device.

The management adaptation scheme of the network access device can include management items supported by the network access device, options supported by the management items, etc.

The management items supported by the network access device can includes: an operating state, a LAN port state, a wireless state, a WAN port state, a setting wizard, a QSS security setting, network parameter, a wireless setting, a DHCP server, a forwarding rule, a security setting, a routing function, an IP bandwidth control, IP and MAC banding, a dynamic DNS, a system tool, etc.

The operating state can include: version information (e.g., the current software version and the current hardware version), an LAN port state (e.g., an MAC address, an IP address, and a sub-net mask), a wireless state (e.g., a wireless function, an SSID, a channel, a mode, a frequency band bandwidth, an MAC address, and a WDS state), a WAN port state (e.g., an MAC address, an IP address, a subnet mask, a gateway, a DNS server, and an Internet access period), a WAN port traffic statistic, etc.

The network parameter can particularly include: an LAN port setting (e.g., an MAC address, an IP address, and a subnet mask), a WAN port setting (e.g., a WAN port connection type, an Internet access account, an Internet access password, a confirmation password, and special dialing), and MAC address cloning.

The wireless setting can particularly include: a general setting (e.g., an SSID number, a channel, a mode, and a frequency band bandwidth), a wireless security setting, wireless MAC address filtering, an advanced wireless setting, a host state, etc.

The DHCP server can particularly include: a DHCP service, a list of clients, static address allocation, etc.

The forwarding rule can particularly include: a virtual server, a special application, a DMZ host, an UPnP setting.

The security setting can particularly include: a firewall setting, IP address filtering, domain name filtering, MAC address filtering, remote Web management, an advanced security setting, etc.

The routing function can particularly include: a static routing table, etc.

The IP and MAC binding can particularly include: a static ARP binding setting, an ARP mapping table, etc.

The system tool can particularly include: a time setting, a diagnosis tool, a software tool, a software upgrade, restoring of a factory setting, back-up and loading configuration, restarting of a router, modification of a logon password, a system log, and a traffic statistic.

At S130, the terminal device executes the management adaptation scheme of the network access device.

Particularly the terminal device can install automatically the management adaptation scheme of the network access device upon reception thereof, and can display an icon of the adaptation scheme in a home page of the terminal device.

The terminal device can execute the management adaptation scheme of the network access device as follows: the management adaptation scheme of the network access device in the terminal device converts a network access device management command input by the user into a URL-based message, and sends the URL-based message to the network access device.

Particularly after the adaptation scheme of the network access device is invoked to be executed (e.g., clicked on to be activated), the adaptation scheme of the network access device will display a network access device management interface to the user, and the user can input the network access device management command of the user via the interface, for example, if the user clicks on a password modification button in the network access device management interface, then the adaptation scheme of the network access device will receive a command for modifying the logon password of the network access device input by the user via a password modification interface. The adaptation scheme of the network access device can take the network access device management command input by the user as a parameter in the URL-based message, where a destination address of the URL-based message shall be the access address of the network access device, thus the network access device can receive the URL-based message directly, and the network access device can operate according to the parameter carried in the URL-based message, thereby enabling management on the network access device. The destination address of the URL-based message can be an address preset in the adaptation scheme of the network access device.

A second embodiment relates to an apparatus for managing a network access device. The apparatus is structured as illustrated in FIG. 3.

Figure 3:
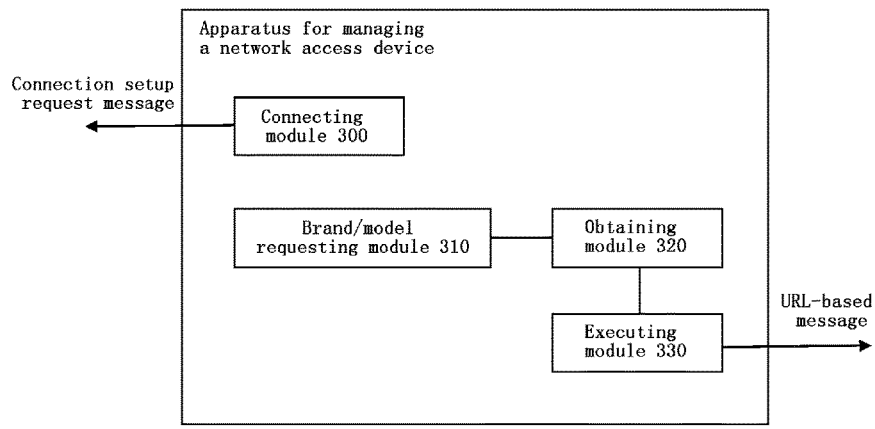
FIG. 3 illustrates a schematic diagram of an apparatus for managing a network access device according to an embodiment of the invention.

The apparatus in FIG. 3 mainly includes a connecting module 300, a brand/model requesting module 310, an obtaining module 320, and an executing module 330.

The connecting module 300 is mainly configured to set up a connection between a terminal device and the network access device.

Particularly the terminal device can be an intelligent mobile phone (e.g., an intelligent mobile phone based upon the Android operating system, an intelligent mobile phone based upon the iOS operating system, etc.), a tablet computer (e.g., a notebook computer, a desktop computer, etc.), etc.; and the network access device can be a routing device, and particularly a wireless routing device (e.g., a home wireless routing device, an enterprise wireless routing device, etc.).

When the network access device is a wireless routing device, after locating the wireless access hotspots, the connecting module 300 will send the connection setup request message to the network access device corresponding to one of wireless access hotspots selected by a user, so that the terminal device sets up the wireless connection with the network access device.

The brand/model requesting module 310 is connected with the obtaining module 320, and the brand/model requesting module 310 is mainly configured to send a brand/model request message to the network access device through the terminal device, and to obtain information characterizing the brand/model of the network access device from a brand/model response message returned by the network access device to the terminal device.

The brand/model request message sent by the brand/model requesting module 310 is mainly configured to obtain the brand/model information of the network access device from the network access device. The brand/model request message can be a message based upon the Hypertext Transfer Protocol (HTTP).

The information characterizing the brand/model of the network access device can be the brand/model information of the network access device, or can be an index, a serial number or another identifier corresponding to the brand/model information of the network access device; that is, after receiving the brand/model request message, the network access device can obtain its brand/model information directly from its corresponding memory space, and return the brand/model response message carrying the brand/model information directly to the terminal device. Of course the network access device can alternatively return the brand/model response message carrying the index, the serial number or the other identifier corresponding to the brand/model information to the terminal device, where the brand/model response message can also be a message based upon the HTTP.

The obtaining module 320 is connected with the executing module 330; and the obtaining module 320 is mainly configured for the terminal device to initiate a query request according to the information characterizing the brand/model of the network access device obtained by the brand/model requesting module 310, to obtain a management adaptation scheme of the network access device corresponding to the information characterizing the brand/model of the network access device from pre-stored management adaptation schemes of network access devices with respective brands/models.

Particularly the obtaining module 320 can obtain the management adaptation scheme of the network access device corresponding to the information characterizing the brand/model of the network access device from a server (e.g., a cloud server, etc.), and in a particular example, the obtaining module 320 includes a requesting sub-module and an obtaining sub-module, where the requesting sub-module is mainly configured to carry the information characterizing the brand/model of the network access device obtained by the brand/model requesting module 310 in an adaptation scheme request message, to take the address of the server pre-stored in the terminal device as a destination address of the adaptation scheme request message, and to send the adaptation scheme request message to the server through the terminal device; the management adaptation schemes of the network access devices with the respective brands/models are pre-stored in the server, and these management adaptation schemes of the network access devices with the respective brands/models can be obtained by collecting management adaptation schemes of existing network access devices with respective brands/models in the existing market; and after receiving the adaptation scheme request message sent by the requesting sub-module through the terminal device, the server (e.g., the cloud server) obtains the information characterizing the brand/model of the network access device from the adaptation scheme request message, selects, by using the information the management adaptation scheme of the network access device corresponding to the information characterizing the brand/model of the network access device from the management adaptation schemes of the network access devices with the respective brands/models pre-stored in the server, that is, selects the adaptation scheme of the network access device, and returns the selected adaptation scheme to the terminal device sending the request message, for example, sends an adaptation scheme response message carrying the selected adaptation scheme to the terminal device. The obtaining sub-module is mainly configured to obtain the management adaptation scheme of the network access device from the message (e.g., the adaptation scheme response message) received by the terminal device.

Moreover the obtaining module 320 in the embodiment of the invention can alternatively obtain the management adaptation scheme of the network access device, corresponding to the information characterizing the brand/model of the network access device from the information stored in the terminal device where the obtaining module 320 is located. In a particular example, the obtaining module 320 particularly includes a storing sub-module and a querying sub-module, where the storing sub-module is mainly configured to pre-store the management adaptation schemes of the network access devices with the respective brands/models, these management adaptation schemes of the network access devices with the respective brands/models can be obtained by collecting the management adaptation schemes of the existing network access devices with the respective brands/models in the existing market, and the collected management adaptation schemes of the network access devices with the respective brands/models can be synchronized into the storing sub-module of the terminal device through the server; and the querying sub-module is configured, after the terminal device receives the information characterizing the brand/model of the network access device returned by the network access device, to select the management adaptation scheme of the network access device corresponding to the information characterizing the brand/model of the network access device from the management adaptation schemes of the network access devices with the respective brands/models pre-stored in the storing sub-module, by using the information, that is, to select the adaptation scheme of the network access device.

The management adaptation scheme of the network access device can include management items supported by the network access device, options supported by the management items, etc. The details about the management items supported by the network access device have been described in the embodiment of the method above and are not repeated here.

The executing module 330 is mainly configured, after the obtaining module 320 obtains the management adaptation scheme of the network access device corresponding to the information characterizing the brand/model of the network access device, to execute the management adaptation scheme of the network access device.

Particularly the executing module 330 can install automatically the adaptation scheme in the terminal device. That is, the executing module 330 can perform automatic installation after the terminal device receives the adaptation scheme of the network access device, and can display an icon of the adaptation scheme in a home page of the terminal device after the adaptation scheme is installed successfully.

The executing module 330 is further particularly configured to convert a network access device management command input by the user into a URL-based message, and to send the URL-based message to the network access device for managing the network access device.

Particularly after the adaptation scheme of the network access device is invoked to be executed (e.g., clicked on to be activated), the adaptation scheme of the network access device will display a network access device management interface to the user, and the user can input the network access device management command of the user via the interface, for example, if the user clicks on a password modification button in the network access device management interface, then the executing module 330 will receive a command for modifying the logon password of the network access device input by the user via a password modification interface. The executing module 330 can take the network access device management command input by the user as a parameter in the URL-based message, and the executing module 330 shall set a destination address of the URL-based message to an access address of the network access device, thus the network access device can receive directly the URL-based message sent by the executing module 330 through the terminal device, and the network access device can operate according to the parameter carried in the URL-based message, thereby enabling management on the network access device. The destination address of the URL-based message can be an address preset in the adaptation scheme of the network access device, where the address is stored at a predetermined position in the terminal device after the adaptation scheme is installed in the terminal device.

The algorithms and displays provided here will not be inherently relevant to any particular computer, virtual system or another device. Various general systems can also be used with the teaching based upon the disclosure here. Construction of structures required for these systems will be apparent from the description above. Moreover the invention will not be directed to any particular programming language. It shall be appreciated that the disclosure of the invention described here can be put into practice in a variety of programming languages, and the description made above in terms of the particular language is merely for the purpose of disclosing the best modes of the invention.

Numerous particular details have been given in the description provided here. However it shall be appreciated that the embodiments of the invention can be put into practice without these particular details. In some examples, well-known methods, structures and technologies have not bee illustrated in details so as not to obscure understanding of the description.

Similarly it shall be appreciated that in order to simplify the disclosure and facilitate understanding of one or more of the respective aspects of the invention, the respective features of the invention in the description above of the exemplary embodiments of the invention sometimes have been grouped together in a single embodiment or figure or a description thereof. However the method disclosed here shall not be construed as reflecting such an intension that more than the features expressively recited in each claims will be required for the invention as claimed here. More precisely, less than all the features in the single embodiment disclosed earlier will be required in any aspect of the invention as reflected in the appended claims. Thus the particular claim will be hereby incorporated expressively into the claims complying with the particular embodiments, where each of the claims itself is embodied as a separate embodiment of the invention.

Those skilled in the art can appreciate that the modules in the device according to the embodiment can be adapted and they can be arranged in one or more devices from the embodiment. The modules or units or components in the embodiment can be combined into a single module or unit or component, and moreover they each can be divided into a number of sub-modules or sub-units or sub-components. Unless at least some of these features and/or processes or elements are mutually exclusive, the respective features disclosed in the description (including the appended claims, the abstract and the drawing) and the respective processes or elements in any method or device disclosed as such can be combined in any combination. Unless stated otherwise, each of the features disclosed in the description (including the appended claims, the abstract and the drawing) can be replaced by an alternative feature for the same, equivalent or similar purpose.

Moreover those skilled in the art can appreciate that although some embodiments described here include some features but not the other features, the features in the different embodiments can be combined into further different embodiments without departing from the scope of the invention. For example, any of the embodiments claimed in the appended claims can be applied in any combination.

The respective components in the embodiments of the invention can be embodied in hardware or in software modules run in one or more processors or in any combination of both. Those skilled in the art shall appreciate that some or all of the functions of some or all of the components in the device for switching a user mode of an intelligent terminal according to the embodiment of the invention can be performed in a microprocessor or a Digital Signal Processor (DSP) in practice. The invention can also be embodied as a device or apparatus program (e.g., a computer program and a computer program product) for performing a part or all of the method described here. Such a program in which the invention is embodied can be stored on a computer readable medium or can be embodied in the form of one or more signals. The signal or signals can be downloaded from a website on the Internet or can be available on a carrier signal or can be provided in any other form.

Figure 4:
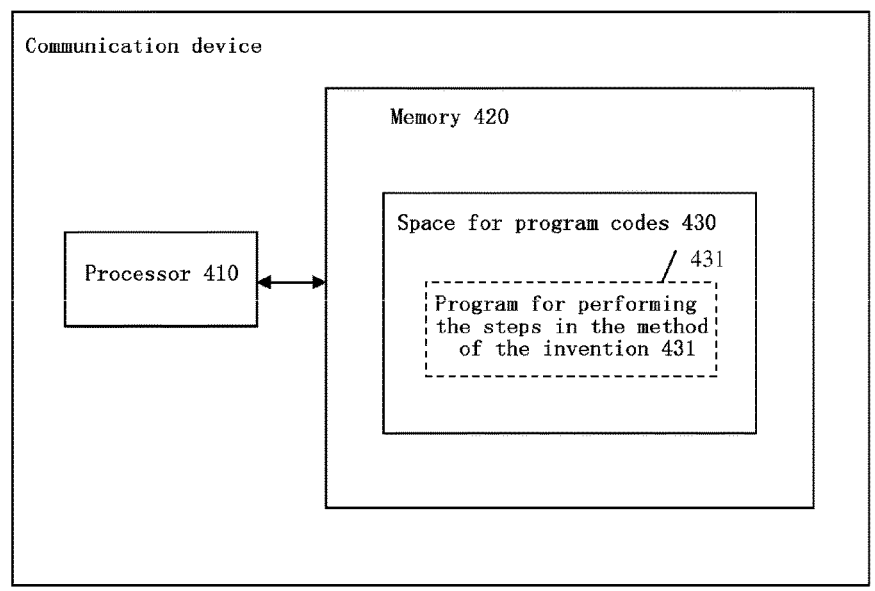
FIG. 4 illustrates a block diagram of a communication device for performing the method according to the invention.
Figure 5:
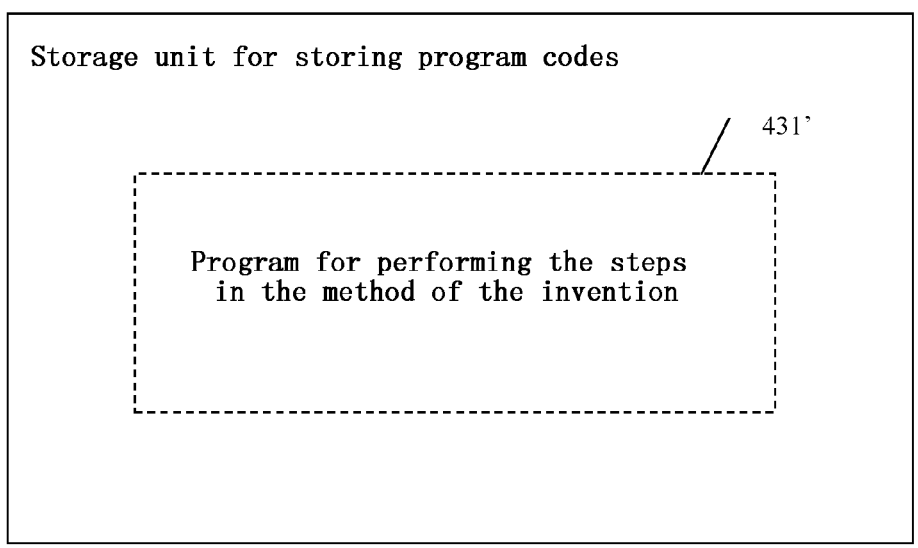
FIG. 5 illustrates a schematic diagram of a storage unit for holding or carrying program codes to perform the method according to the invention.

For example, FIG. 4 illustrates a communication device in which the method for managing a network access device according to the invention can be embodied. The communication device traditionally includes a processor 410, and a computer program product or a computer readable medium in the form of a memory 420. The memory 420 can be an electronic memory, e.g., a flash, an Electrically Erasable Programmable Read Only Memory (EEPROM), an EPROM, a hard disk, an ROM, etc. The memory 420 is provided with a storage space 430 for program codes 431 to perform any of the steps in the method above. For example, the storage space 430 for the program codes can include respective program codes 431 for performing the respective steps in the method above respectively. These program codes can be read from or written into one or more computer program products including a program code carrier, e.g., a hard disk, a Compact Disk (CD), a memory card, a floppy disk, etc. The computer program product or products is or are typically a portable or fixed storage unit as illustrated in FIG. 4. The storage unit can be provided with storage segments, a storage space, etc., arranged similarly to the memory 420 in the terminal device illustrated in FIG. 4. The program codes can be compressed in an appropriate form, for example. Typically the storage unit contains program 431' for performing any of the steps in the method according to the invention, i.e., codes which can be read by a processor, e.g., the processor 410, etc., and which upon running on the terminal device cause the terminal device to perform the respective steps in the method described above.

It shall be noted that the embodiments above are intended to illustrate but not to limit the invention, and those skilled in the art can devise alternative embodiments without departing from the scope of the appended claims. Any reference numerals placed between parentheses in the claims shall not be construed as limiting the scope of the claims. The term "comprises/comprising" shall not preclude the presence of an element or a step which has not been listed in any claim. The term "a/an" preceding an element shall not preclude the presence of a plurality of such elements. The invention can be embodied in hardware including several different elements or in an appropriately programmed computer. In any claim in which several units of a device are listed, several of the units can be embodied particularly in the same item of hardware. The use of the terms "first", "second", "third", etc., shall not suggest any particular order, but these terms can be interpreted as names.

The invention claimed is:

1. An apparatus for managing a network access device, the apparatus comprising one or more non-transitory computer readable medium configured to store computer-executable instructions and at least one processor configured to execute the computer-executable instructions to:
   set up a connection between a terminal device and the network access device;
   send, by the terminal device, a brand/model request message to the network access device, and obtain information characterizing the brand/model of the network access device from a brand/model response message returned by the network access device;
   initiate, by the terminal device, a query request according to the information characterizing the brand/model of the network access device to obtain a management adaptation scheme of the network access device corresponding to the information characterizing the brand/model of the network access device from pre-stored management adaptation schemes of network access devices with respective brands/models, the query request initiated by carrying the information characterizing the brand/model of the network access device in an adaptation scheme request message, sending the adaptation scheme request message to a server according to a preset address of the server, and obtaining the management adaptation scheme of the network access device corresponding to the information characterizing the brand/model of the network access device from an adaptation scheme response message from the server; and
   execute, at the terminal device, the corresponding management adaptation scheme of the network access device by converting a network access device management command input by a user into a URL-based message, and sending the URL-based message to the network access device so that the network access device performs the corresponding operation according to the network access device management command,
   wherein the management adaptation scheme of the network access device corresponding to the information characterizing the brand/model of the network access device is selected by the server from the management adaptation schemes of the network access devices with the respective brands/models stored by the server.

2. The apparatus according to claim 1, wherein the at least one processor is configured to execute the computer-executable instructions to:
   pre-store, by the terminal device, the management adaptation schemes of the network access devices with the respective brands/models; and
   obtain, by the terminal device, the management adaptation scheme of the network access device corresponding to the information characterizing the brand/model of the network access device from the management adaptation schemes of the network access devices with the respective brands/models pre-stored by the terminal device according to the information characterizing the brand/model of the network access device.

3. The apparatus according to claim 1, wherein the management adaptation scheme of the network access device comprises management items supported by the network access device and options supported by the management items.

4. The apparatus according to claim 1, wherein the terminal device comprises an intelligent mobile phone, a tablet computer, a notebook computer, or a desktop computer.

5. A non-transitory computer readable medium having instructions stored thereon for managing a network access device that, when executed by at least one processor, cause the at least one processor to:
   set up, by a terminal device, a connection with the network access device;
   send, by the terminal device, a brand/model request message to the network access device, and obtaining information characterizing the brand /model of the network access device from a brand/model response message returned by the network access device;
   initiate, by the terminal device, a query request according to the information characterizing the brand/model of the network access device to obtain a management adaptation scheme of the network access device corresponding to the information characterizing the brand/model of the network access device from pre-stored management adaptation schemes of network access devices with respective brands/models, the query request initiated by carrying the information characterizing the brand/model of the network access device in an adaptation scheme request message, sending the adaptation scheme request message to a server according to a preset address of the server, and obtaining the management adaptation scheme of the network access device corresponding to the information characterizing the brand/model of the network access device from an adaptation scheme response message from the server; and
   execute, by the terminal device, the corresponding management adaptation scheme of the network access device by carrying, by the management adaptation scheme of the network access device in the terminal device, a network access device management command input by a user in a URL-based message, and sending the URL-based message to the network access device so that the network access device performs the corresponding operation according to the network access device management command,
   wherein the management adaptation scheme of the network access device corresponding to the information characterizing the brand/model of the network access device is selected by the server from the management adaptation schemes of the network access devices with the respective brands/models stored by the server.

6. A method for managing a network access device, the method comprising:
   setting up, by a terminal device, a connection with the network access device;
   sending, by the terminal device, a brand/model request message to the network access device, and obtaining information characterizing the brand/model of the network access device from a brand/model response message returned by the network access device;
   initiating, by the terminal device, a query request according to the information characterizing the brand/model of the network access device to obtain a management adaptation scheme of the network access device corresponding to the information characterizing the brand/model of the network access device from pre-stored management adaptation schemes of network access devices with respective brands/models, including carrying the information characterizing the brand/model of the network access device in an adaptation scheme request message, sending the adaptation scheme request message to a server according to a preset address of the server, and obtaining the management adaptation scheme of the network access device corresponding to the information characterizing the brand/model of the network access device from an adaptation scheme response message from the server; and executing, by the terminal device, the corresponding management adaptation scheme of the network access device including carrying, by the management adaptation scheme of the network access device in the terminal device, a network access device management command input by a user in a URL-based message, and sending the URL-based message to the network access device so that the network access device performs the corresponding operation according to the network access device management command, wherein the management adaptation scheme of the network access device corresponding to the information characterizing the brand/model of the network access device is selected by the server from the management adaptation schemes of the network access devices with the respective brands/models stored by the server.

7. The method according to claim 6, wherein initiating the query request comprises:

pre-storing, by the terminal device, the management adaptation schemes of the network access devices with the respective brands/models; and obtaining, by the terminal device, the management adaptation scheme of the network access device corresponding to the information characterizing the brand/model of the network access device from the management adaptation schemes of the network access devices with the respective brands/models pre-stored by the terminal device, according to the information characterizing the brand/model of the network access device.

8. The method according to claim 6, wherein the management adaptation scheme of the network access device comprises management items supported by the network access device, and options supported by the management items.

9. The method according to claim 6, wherein the terminal device comprises an intelligent mobile phone, a tablet computer, a notebook computer, or a desktop computer.

* * * * *